L. C. FIELD.
BEATING DEVICE FOR BALING PRESSES.
No. 48,621. Patented July 4, 1865.
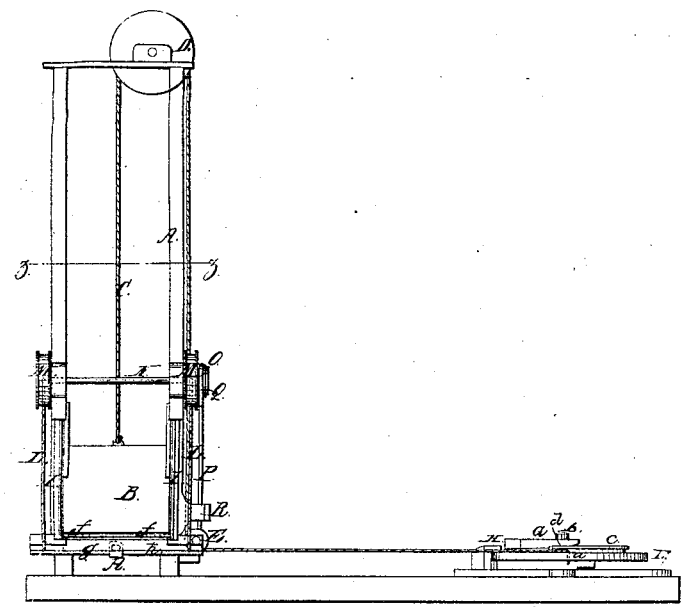
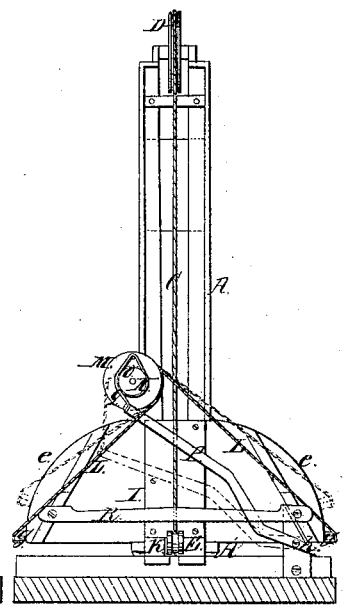
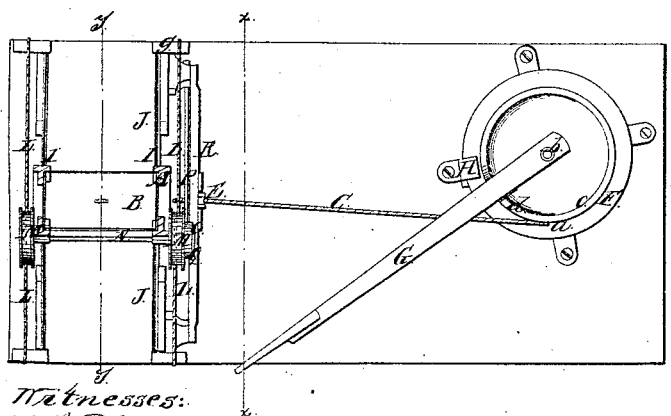
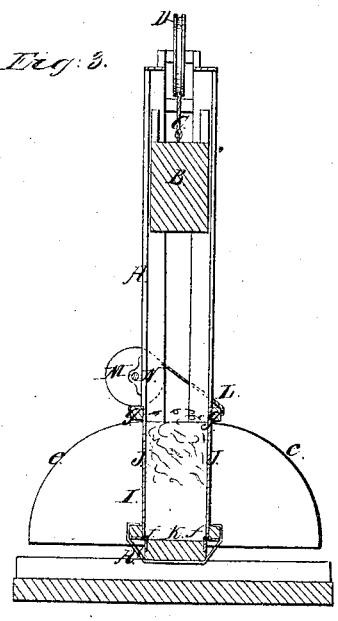

UNITED STATES PATENT OFFICE.

LOYAL C. FIELD, OF GALESBURG, ILLINOIS, ASSIGNOR TO HIMSELF, JOS. P. FROST, AND W. S. BELLOWS, ASSIGNORS TO J. P. FROST & CO., OF SAME PLACE.

IMPROVEMENT IN BEATING DEVICES FOR BALING-PRESSES.

Specification forming part of Letters Patent No. 48,621, dated July 4, 1865.

*To all whom it may concern:*

Be it known that I, LOYAL C. FIELD, of Galesburg, in the county of Knox and State of Illinois, have invented a new and Improved Beating Device for Baling-Presses; and I do hereby declare that the following is a full, clear, and exact description thereof, which will enable others skilled in the art to make and use the same, reference being had to the accompanying drawings, forming part of this specification, in which—

Figure 1 is an elevation of my invention; Fig. 2, a transverse vertical section of the same, taken in the line $x\,x$, Fig. 4; Fig. 3, a transverse vertical section of the same, taken in the line $y\,y$, Fig. 4; Fig. 4, a horizontal section of the same, taken in the line $z\,z$, Fig. 1.

Similar letters of reference indicate like parts.

This invention relates to a new and improved beating device for compacting substances preparatory to pressing them into bale form.

The invention is more especially designed for compacting those substances which have considerable spring or elasticity on account of tubular structure—such as straw, hay, &c.—and is designed as an improvement on the beating devices hitherto employed to operate in connection with the press itself, and which beat or compact the substance in the press-box of the press. This plan of beating the substance in the press-box is defective on account of different layers of the several beatings remaining in the box, and serving in a very material degree to relieve the top layer or mass thrown in from the full effective blow of the beater when it descends, as every layer or mass to be beaten after the first one rests upon the mass previously beaten, which forms a soft or yielding bed. This difficulty is fully obviated by my invention, as will be hereinafter fully shown.

A represents an upright framing, in which the beater B is placed and allowed to rise and fall freely therein, the framing being constructed in any proper manner to serve as a proper guide for the beater.

C represents a rope or cord, which passes over a pulley, D, at the upper part of the framing A, and extends down by the side of the framing, and passes underneath a pulley, E, attached thereto, and extends from thence to a horizontal wheel, F, to which it is attached, as shown at $a$ in Figs. 1 and 4. The wheel F is placed loosely on a vertical axis, $b$, and said wheel has a circular concentric rim, $c$, on its upper surface, rather smaller in diameter than the wheel, and around which rim $c$ the rope C is wound in order to raise the beater. The wheel F is rotated by a horse (one or more) or other draft-animal through the medium of a sweep, G, one end of which is fitted loosely on the axis $b$ of the wheel F, above the latter, the sweep in turning the wheel bearing against a shoulder, $d$, formed by making a notch or recess in the rim. (See Figs. 1 and 4.) The wheel F makes nearly a complete revolution in order to elevate the beater to the desired height; and in order to admit of the descent of the beater the wheel F is relieved from the sweep G, which is done by having the latter pass over an inclined plane, H, placed by the side of the wheel F, and at such a point that the sweep will be raised free from the shoulder $d$ when the beater reaches the desired height, the beater then falling by its own gravity, and the sweep engaging with the shoulder $d$ as soon as the wheel has completed its reverse movement under the fall of the beater. Thus it will be seen that the beater is operated by a continuous movement of the sweep.

At the lower part of the framing A, at two opposite sides thereof, there are side pieces, I I, the ends of which are of quadrant form, as shown at $e\,e$ in Fig. 3, and project considerably beyond the framing A.

J J are two doors, which are attached by hinges $f\,f$ to a bottom piece, K, at the lower end of the framing A, and these doors have bars $g$ attached to their ends, which project over the curved edges $e\,e$ of the side pieces, I I, and have ropes or cords L attached to them, which are connected to pulleys M M on shaft N at one side of the framing A. By turning this shaft N the ropes or cords L will be wound upon the pulleys M M and the doors J J elevated or raised to a vertical position, forming, in connection with the side pieces, I I, a box to receive the beater B when it descends. (See Fig. 3.) This raising or elevating of the doors is performed automatically as follows: To one of the pulleys M there is attached concentrically a smaller pulley, O, (shown in Figs. 1, 2, and 4,) and P is a lever, the fulcrum-pin h of which is at one end, the opposite end being connected by a strap, Q, with the pulley O, or to the outer side of the adjoining pulley M, so that it will wind upon pulley O. (See Fig. 2.) The doors J J, when allowed or left free, will fall to a horizontal position by their own gravity, assisted by a spring, A', and cause the strap Q to be wound upon pulley O, the lever P being thereby elevated so as to have an inclined position, as shown clearly in Fig. 2.

R is a horizontal guide-bar, which is attached to the exterior of one of the side pieces, I, a short distance above the fulcrum-pin h of the lever P.

The sweep G is of such a length that its outer end will, while being drawn around, pass over the lever P and elevate the doors J J by turning the shaft N through the medium of the strap Q and pulley O, the guide-bar R retaining the outer end of the sweep on lever P. These doors J J are thus elevated just previous to the passage of the sweep G on the inclined plane H, and the doors are held in an elevated position by the sweep G until the beater falls, by which time the end of the sweep G will have passed off from the lever P, and the doors J J fall by their own gravity, in connection with the spring A', and wind the strap Q upon the pulley O. Thus at every revolution of the sweep G the beater B is elevated, the doors J J raised, and retained in that position until the beater drops and the doors fall by their own gravity.

The substance to be compacted is placed by the attendant or operator on the bottom K when the doors J J are down, and after each descent of the beater the beaten or compacted substance is removed and another mass or quantity placed on bottom K. Thus each mass or quantity, when acted upon by the beater, rests upon a firm solid bottom, and consequently will be compacted or have the "spring," as it is technically termed, taken from it in a much greater degree than when beaten, as hitherto, in the press-box and upon layers or masses previously beaten.

Having thus described my invention, I claim as new and desire to secure by Letters Patent—

1. Closing the doors automatically just previous to the liberation and fall of the beater, and opening them after its fall by means of the horse-power by mechanism substantially as herein described, and for the purposes specified.

2. The connecting of the doors J J to pulleys M on a shaft, N, by means of chains, ropes, or cords L, the lever P, connected to a pulley, O, on shaft N by a chain, cord, or strap, Q, when said parts are used in connection with a rising and falling beater, B, and a horse-power or other motor, all arranged to operate substantially as and for the purpose set forth.

LOYAL C. FIELD.

Witnesses:
R. B. CARSON,
ZIMRI POND.